Figure 1:
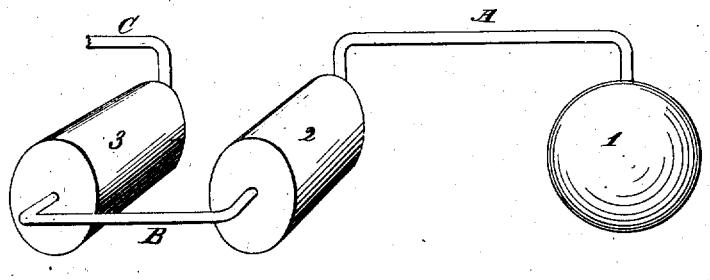
Figure 2:
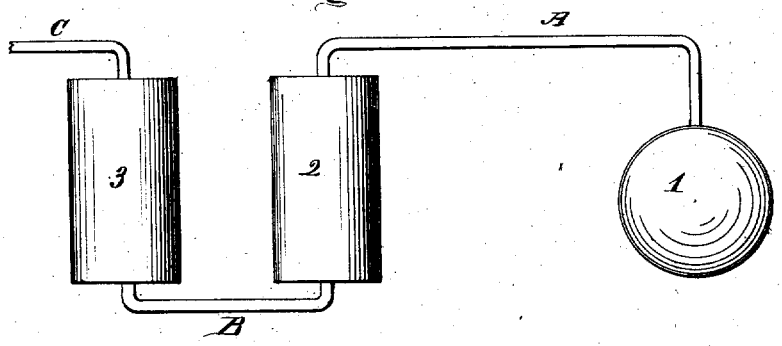

W. C. WREN & W. BARKER.

Methods of Making Illuminating Gas from Petroleum.

No. 5,873. Reissued May 12, 1874.

Witnesses:

Joshua Barhart

David G. Ringland

Inventors:

William C Wren

William Barker

UNITED STATES PATENT OFFICE.

WILLIAM C. WREN AND WILLIAM BARKER, OF BROOKLYN, NEW YORK; SAID BARKER ASSIGNOR, BY MESNE ASSIGNMENTS, TO SAID WREN.

IMPROVEMENT IN THE METHODS OF MAKING ILLUMINATING GAS FROM PETROLEUM.

Specification forming part of Letters Patent No. 56,843 dated July 31, 1866; reissue No. 5,873, dated May 12, 1874; application filed May 6, 1874.

DIVISION A.

*To all whom it may concern:*

Be it known that I, WILLIAM C. WREN, of the city of Brooklyn, county of Kings and State of New York, did, in connection with one WILLIAM BARKER, invent an Improvement in the Method of Making Illuminating-Gas, of which the following is a specification:

This invention has especial reference to the production of gas from petroleum and kindred materials.

To the full comprehension of said invention it is desirable to understand certain properties of these hydrocarbons which are well known. Among these are the following facts, viz., that by subjecting these materials to a comparatively low heat they will be vaporized, and, if allowed to cool, the vapor will condense into a more refined product, the result being a distillation. But by subjecting this vapor to contact with a red-hot surface, a decomposition of the vapor can be produced, resulting in a fixed gas, suitable and valuable for illuminating purposes. If, however, the surface with which this vapor is brought in contact is at a heat far above a red heat, the fixed gas will undergo a destructive decomposition, rendering it valueless.

Prior to this invention attempts had been made to utilize these properties of the hydrocarbons by vaporizing the crude material from a generator placed in a stove or furnace somewhat remote from the point of intensest heat, and then conducting the vapor to a surface in the same furnace, rendered red-hot by being nearer the point of intensest heat; but for obvious reasons this was not sufficiently practical to enable the production of gas with the perfection requisite to prove remunerative. The temperature of the vapor is several hundred degrees below the temperature at which the decomposition into fixed gas takes place, and it is evident that if vapor created at a comparatively low temperature comes continuously into immediate contact with a surface heated to the point which will convert the vapor into a fixed gas, the result will be a diminution of the heat of the latter surface to a point insufficient to create the fixed gas, and a condensation in some of the subsequent portions of the vapor will ensue, while an attempt to raise the heat of the retort or fixing-chamber to a degree sufficient to allow for a partial cooling would result in a heat which would at first cause destructive decomposition of much of the gas.

It was found to be impracticable to attempt to produce successful vaporization and decomposition into fixed gas by the same immediate source of heat.

In speaking of vaporization as produced in this process, we do not wish to be misunderstood as confounding it with mere volatilization. Some of the lighter and refined hydrocarbons will volatilize at a very low heat, and attempts had been made prior to this invention to charge a current of air or of steam passed over or through them while warm with the vapor, which was carried by said current into a retort, where by a high heat it was converted into a fixed gas for illuminating purposes. This process is here disclaimed, inasmuch as the essential feature of the first part of this invention is the vaporizing of the hydrocarbon, and causing the vapor to flow toward the retort by the action of heat, which is to be powerful enough to cause the vapor to be evolved and flow over by a process resembling distillation, without requiring a blast of air or steam to carry the vapor to the retorts.

The first part of the invention, therefore, consists in the use of a distinctly regulatable source of heat for converting the vapor into a fixed gas, by which the temperature of the retort or superheater can be increased or varied without varying the temperature of the vaporizer or still, the latter being heated so as to cause evolution and flow of vapor without the assistance of a current of air or steam to carry it over.

The second part of the invention consists in the provision made for avoiding the loss of temperature, and consequent imperfect conversion of the vapor into gas, which would ensue from conducting the cooler vapor into a single fixed retort; and to accomplish this we combine, with the retort which receives the vapor, one or more superheaters or extra retorts, of which the ones nearer the vaporizer raise the temperature of the vapor, and commence the transformation of the vapor into gas, while the farther ones complete the process, and evolve the product in a gaseous state, without any material waste or condensation of partially-decomposed vapor.

The apparatus used is shown in the annexed drawing, in which 1 is the still or vaporizing-chamber used to hold the hydrocarbon. A heat under 500° is generally sufficient to convert into vapor even the densest materials which are used as suitable for this process. Where liquid hydrocarbons are used, the amount of heat required will vary with the gravity of the material. The vapor by its expansion passes through a pipe, A, to the retort or superheater 2, which is heated by a fire producing a more intense heat, and where the process of conversion into a fixed gas commences, or where the vapor is raised to a degree of heat which greatly lessens the cooling effect it would otherwise have on the succeeding retort 3, from which the gas can be readily evolved. To make the transformation of the vapor into gas as perfect as possible, and to prevent the escape of any unfixed or condensable vapor, successive retorts or superheaters can be added, connected by pipes in a similar manner, the number of superheaters depending on the volume of vapor used, and the rapidity of production required. It has been found of advantage to introduce into these retorts or superheaters, where but one or two are used, ashes or similarly porous material, which aids in the evolution of the fixed gas. The gas emerging from the last retort or superheater is conducted in the usual manner to the gasometer or receiver for use.

By this process a practical and successful method is furnished of producing gas of a far greater illuminating power than the ordinary coal-gas, and at a cost less than that of producing an equal amount of the latter.

I do not claim in this invention the discovery that the vapor of hydrocarbons can be converted into a fixed gas by subjecting it to contact with a red-hot surface; nor do I claim the discovery that the same result can be attained by using a charged current of air or steam; nor do I claim, broadly, the production of gas from petroleum; but What I do claim as new, and desire to secure by Letters Patent, is—

1. The within-described process of making gas, to wit, first, producing from hydrocarbons, by the force of heat, the evolution and flow of vapor into a retort or superheater, where it is converted into a fixed gas by a fire separate from the heater, which evolves and forces over the vapor, substantially as described.

2. The process of making gas within described, to wit, passing the vapor of hydrocarbon through two or more superheaters or retorts, the first of which raises the temperature, and the succeeding ones complete the conversion into gas, substantially as described.

3. The process in gas-making within described, viz., converting hydrocarbons into vapor by means of heat, and then passing the vapor, substantially in the manner and for the purpose described, through a series of two or more superheaters or retorts, which are heated by a fire or fires separate from the heater which vaporizes the crude materials.

WILLIAM C. WREN.

Witnesses:
F. W. HANAFORD,
HENRY ENTENSA.